Aug. 5, 1958 W. I. KNAPP 2,845,666
PLASTICS FILLET
Filed April 13, 1953
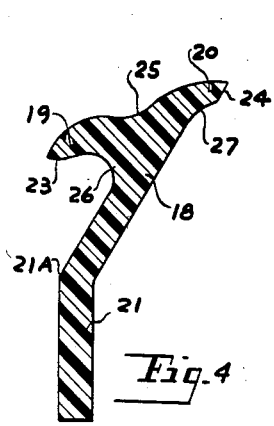
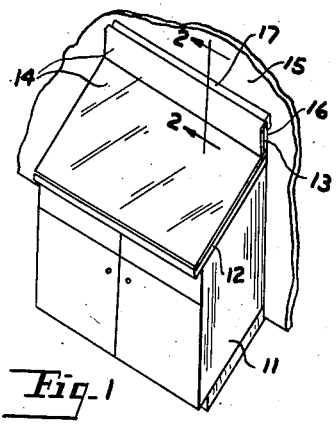
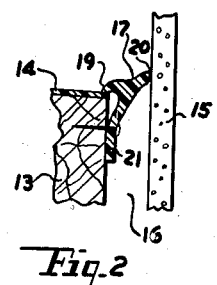
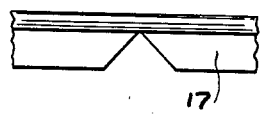
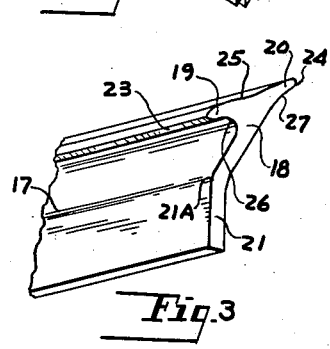
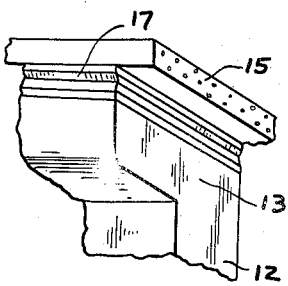
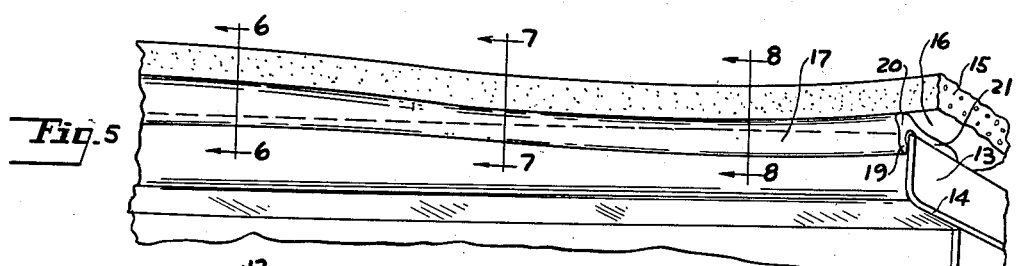
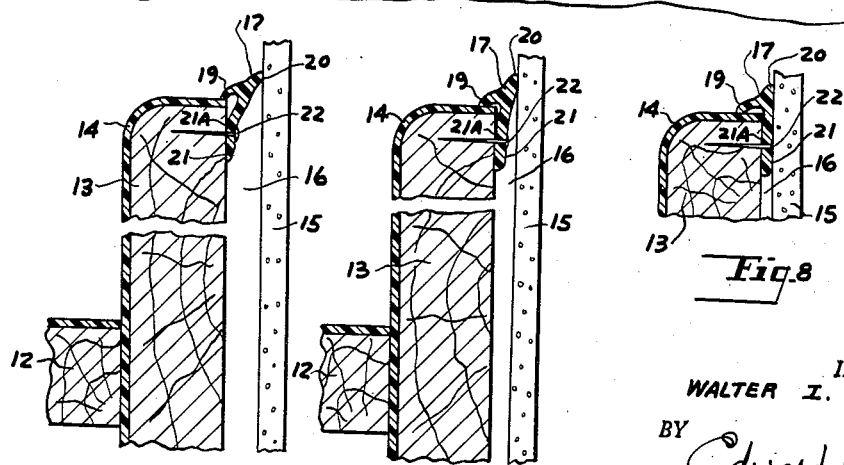
INVENTOR.
WALTER I. KNAPP
BY Edward M. Apple
ATTORNEY United States Patent Office 2,845,666
Patented Aug. 5, 1958

2,845,666
PLASTICS FILLET

Walter I. Knapp, Detroit, Mich., assignor of fifty percent to Edward M. Apple, Detroit, Mich.

Application April 13, 1953, Serial No. 348,499

8 Claims. (Cl. 20—74)

This invention relates to the building industry and has particular reference to the fabrication, assembly and installation of plastic counter-tops and the like.

An object of the invention is to provide an attractive dirt-free transition element or filet for use between a plastic or other type of counter-top and a wall made of plaster or any other material.

Another object of the invention is to provide an element of the character indicated which is suitable for sealing, filling in and covering up any gap between the normally straight back-splash, riser or counter-top and an irregular, uneven or out-of-square wall, such as found in many new and old buildings.

Another object of the invention is to provide an element of the character indicated, which is economical to manufacture, and easy to store, transport, handle and install.

Another object of the invention is to provide an element of the character indicated which may readily be extruded from various materials and is formed in such manner as to make it readily adaptable to a wide variety of uses.

Another object of the invention is to provide a fillet of the character indicated which may be secured directly to the back-splash during its fabrication at the factory, thereby eliminating the necessity of field application with its attendant higher costs.

Another object of the invention is to provide a fillet of the character indicated which will eliminate the gouging and scraping of the plaster and paint on uneven walls during the installation of the counter-top and back-splash.

Another object of the invention is to provide a fillet of the character indicated which may be made available in various colors of material which will not be adversely affected by grease or the common household acids, and will stand up well under all ordinary room temperatures, summer or winter.

Another object of the invention is to provide a fillet of the character indicated which can be mitre-notched and bent around or over corners.

Another object of the invention is to provide a fillet of the character indicated, which is formed with predetermined lips or flanges, each of which is provided with an angular face of critical moment, whereby unusual results are obtained in its use.

Another object of the invention is to provide a fillet, for use between elements of different contour, which fillet has a native ability to "work" itself into the desired position for effecting the maximum benefits in sealing and calking any void existing between such elements.

Another object of the invention is to provide a fillet of the character indicated, which is formed with lips or flanges each having an angular face, which, upon the application of said faces to other elements having adjacent flat faces, causes a "hugging" action between the fillet and the adjacent flat faces of said other elements, whereby to close and seal any gap between said elements.

Another object of the invention is to provide a fillet of the character indicated, which is formed with a comparatively long, depending flange or leg portion which serves as a primary means for anchoring the fillet securely to another element.

A further object of the invention is to provide a fillet of the character indicated which is formed with a pair of "working" flanges or fingers between which is defined a cove like surface, which is easily kept clean when the fillet is in use.

The foregoing and other objects and advantages of the invention will become more apparent as the description proceeds, reference being made from time to time to the accompanying drawing forming part of the within disclosure, in which drawing:

Fig. 1 is a prespective view of a conventional kitchen cabinet and counter-top, with the device embodying the invention, in assembled relation with the wall of the house.

Fig. 2 is an enlarged fragmentary section taken on the line 2—2 of Fig. 1.

Fig. 3 is an enlarged perspective view of a portion of the fillet embodying the invention.

Fig. 4 is a vertical section taken through the fillet shown in Fig. 3.

Fig. 5 is a perspective view of a wall, counter-top, back-splash and fillet assembly, similar to the assembly shown in Fig. 1, but illustrating the irregularity of the wall and the manner in which the fillet accommodates itself to such irregularity.

Fig. 6 is a view taken on the line 6—6 of Fig. 5, and illustrating the maximum space encountered between the wall and the back-splash.

Fig. 7 is a section taken on the line 7—7 of Fig. 5, and illustrating a lesser space between the wall and the back-splash.

Fig. 8 is a section taken on the line 8—8 of Fig. 5, and illustrating the approximate minimum clearance encountered between the wall and back-splash.

Fig. 9 is a front elevation of a portion of the fillet embodying the invention showing a mitre-notch.

Fig. 10 is an enlarged fragmentary view, in perspective, and illustrating how the fillet may be used at a corner.

Referring now more particularly to the drawing, it will be understood that in the embodiment herein disclosed, the reference character 11 indicates a kitchen cabinet on which is mounted a counter-top 12 having a back-splash 13, both of which last two named elements are preferably covered with a plastic top 14 such as Formica, or the like. The elements just described are intended to be mounted in close relation to a wall 15, which wall may be made of plaster, wood, or any other suitable material which may be painted or otherwise decorated.

The invention is concerned particularly with closing the space 16 which normally occurs between the wall 15 and the back-splash 13.

It is, therefore, the principal object of the invention to provide a transition means between the back-splash 13 and the wall 15, whereby the space 16 therebetween is sealed against the entrance of dirt, water and other substances, and the entire assembly is given an attractive trim and finish, no matter how uneven the wall 15 or no matter how great the variation in the width of the space 16 from one end of the cabinet 11 to the other.

In practicing the invention, I provide a strip of plastic material 17 which is preferably extruded from a suitable material such as vinyl chloride acetate, or other suitable material, which will withstand water, soaps, alkalis, detergents, grease and common household acids. The element 17 is preferably extruded with a hardness of approximately 80 to 90 durometers—Shore, so that it will cold flow and readily take to contours of the average plaster wall and will set itself in place as the cold flow stops in ample time to condition it for long and permanent installation. In such form, the element may be mitre-sawed and bent around corners as hereinbefore indicated.

In its preferred form, the element 17 (Figs. 3 and 4) is extruded with a comparatively thick body portion 18 which terminates in the flanges or lips 19 and 20 and a depending leg portion 21 and a knee portion 21A which is bent at an approximate angle of 30 degrees. The leg 21 is intended to serve as a means for anchoring the strips in position as shown in Figs. 6, 7, and 8, wherein the element 21 is shown attached to the back of the back-splash 13 by means of nails 22.

It is also contemplated to form a hook or return portion on the end of the element 21, whereby the element 21 may be anchored by inserting the hook under the metal finish molding sometimes used on the upper edge of the back splash.

The lips or flanges 19 and 20 terminate in faces 23 and 24 respectively. The face 23 is positioned 90 degrees from vertical and the face 24 is positioned approximately 30 degrees off vertical. These faces 23 and 24 are very important as they are intended to closely hug the surfaces of the counter-top and wall respectively when the device is in use. The body portion 18 is provided with a radius 25 between the lips or flanges 19 and 20, which serves as a cove for easy cleaning of the element when it is in position for use. The body 18 is also provided with a radius 26 between the lips 19 and the leg portion 21 and a radius 27 which is formed between the face 24 and the body portion 18. These radii 26 and 27 are also important as they assist in the cold flowing and "working" of the parts into their final resting place on uneven contours during the installation of the device, as more particularly described hereinafter.

The strip 17 may be attached to the rear of the back-splash 13 at the factory or may be installed in the field if desired. When the leg portion 21 of the strip 17 is secured to the back-splash 13, as shown in Figs. 2, 5, 6, 7, and 8, and the back-splash and counter-top assembly is moved toward the wall 15 the portion of the leg 21 above the knee 21A will tend to be moved toward the back-splash 13. If the final clearance between the back-splash 13 and the wall 15 is the minimum, as shown in Fig. 8, the leg 21 of the fillet 17 will be practically vertical in its final resting place. If the clearance is greater, as shown in Fig. 7, the upper portion of the leg 21 will be slightly inclined toward the wall and when the maximum clearance is encountered between the back-spash 13 and the wall 15, the portion of the leg 21 above the knee will be positioned, as shown in Fig. 6, so that the fillet 17 will accommodate itself to all contours of the wall and will automatically flow or work itself into the proper resting place.

As the leg portion 21 above the knee 21A is moved, there is a corresponding movement of the fingers 19 and 20, with the result that the face 23 of the finger 19 is tightly moved over the upper surface of the back-splash cover 14 and the face 24 of the finger 20 is tightly moved over the surface of the wall 15, until the final position of rest is reached.

The greater the pressure exerted between the counter-top 12 and the back-spash 13—14, and the wall 15, the greater will be the sealing pressures between the fingers 19 and 20 and the back-splash 13 and the wall 15, as a result of the tension developed in the fingers 19 and 20, all of which is augmented by the shape of the fingers and the underlying radii 26 and 27, which prevent the fingers from rolling under or piling up. The radius 25 is also designed so that the fillet will tend to squeeze on itself to provide a wider-shallower or narrower-deeper cove depending upon the position of rest or the shape it is finally forced into, so that the fillet will not pop out or bend and will hold its desired shape.

Thus it will be seen that I have provided a transition element, which will insure an attractive tight and effective seal between the indicated parts regardless of varying contour and uneven spacing.

Having described my invention, what I claim and desire to secure by Letters Patent is:

1. A transition element comprising a length of pliable plastic material having a modified T-shaped cross section, the longer leg of the T having a knee therein defining two sections with an angle there between, the shorter legs of the T each terminating in a face, one of which faces is substantially parallel to one of the sections of said long leg of the T, and the other said face is at right angles to the other section of said long leg of the T.

2. The structure defined in claim 1, in which said T has a thickened body section between said legs, there being a concave curved surface formed on said body section between each of said legs.

3. The structure of claim 1, in which one of said faces is inclined approximately 30 degrees from the longitudinal axis of one of the sections of the long leg of said T, and the other said face lies in a plane positioned approximately 90 degrees from said axis.

4. A transition element of the character described, comprising a length of pliable plastic material having a modified T-shaped cross section, the long leg of the said T consisting of a vertical portion and a portion inclined approximately 30 degrees from the vertical, the short legs of said T being secured to a thickened body portion carried at one end of the inclined portion of said long leg and both said short legs having their axes angularly inclined from the vertical portion of said long leg.

5. The structure of claim 4, in which the said thickened body portion has a concave curved surface formed thereon between each of said legs.

6. The structure of claim 4, in which the said short legs each terminates in a face, the planes of said faces being angularly disposed with respect to each other.

7. The combination with a horizontal member and a vertical member, of a transition element interposed therebetween comprising a length of soft plastic material having a modified T-shaped cross section, the long leg of said T consisting of an angular portion and bearing portion, whereby said element can be secured to one or the other of said first named members, each short leg of said T terminating in a flat face, one of said flat faces being in close contact with the upper face of said horizontal member and the other of said flat faces being in close contct with a side face of said vertical member.

8. The combination of claim 7, in which said transition element has a thickened body portion with a concave curved surface thereon between each of said legs, whereby to increase the tension on the short legs of said T and to increase the pressure between said contacting faces, when said horizontal member and said vertical member are moved closer together.

References Cited in the file of this patent

UNITED STATES PATENTS

| Re. 18,077 | Larson | May 19, 1931 |
| 2,029,845 | Vars | Feb. 4, 1936 |
| 2,457,002 | Spiro | Dec. 21, 1948 |

FOREIGN PATENTS

| 43,938 | Norway | Apr. 19, 1927 |
| 170,420 | Austria | Feb. 25, 1952 |